(12) United States Patent
Tsai et al.

(10) Patent No.: US 11,316,452 B2
(45) Date of Patent: Apr. 26, 2022

(54) ELECTRONIC DEVICE AND CONTROL METHOD THEREOF

(71) Applicant: Delta Electronics, Inc., Taoyuan (TW)

(72) Inventors: Ching-Hsiung Tsai, Taoyuan (TW); Yen-Ming Lu, Taoyuan (TW); Chia-Hui Chen, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 29 days.

(21) Appl. No.: 17/083,703

(22) Filed: Oct. 29, 2020

(65) Prior Publication Data

US 2021/0218353 A1  Jul. 15, 2021

Related U.S. Application Data

(60) Provisional application No. 62/961,488, filed on Jan. 15, 2020.

(51) Int. Cl.
*H02P 6/34* (2016.01)
*H02P 29/00* (2016.01)
*H02P 21/18* (2016.01)

(52) U.S. Cl.
CPC .............. *H02P 6/34* (2016.02); *H02P 21/18* (2016.02); *H02P 29/0016* (2013.01)

(58) Field of Classification Search
CPC ......... H02P 6/34; H02P 21/18; H02P 29/0016
See application file for complete search history.

(56) References Cited

U.S. PATENT DOCUMENTS 5,477,114 A    12/1995   Yamada et al.
10,369,694 B2   8/2019   Laurent et al.
(Continued)

FOREIGN PATENT DOCUMENTS

CN    101263649 B    1/2012
CN    102680016 B    8/2014
(Continued)

OTHER PUBLICATIONS

Vincent Lampaert, Jan Swevers, and Farid Al-Bender, "Modification of the Leuven Integrated Friction Model Structure", IEEE Transactions on Automatic Control, vol. 47, No. 4, Apr. 2002.
(Continued)

*Primary Examiner* — Zoheb S Imtiaz
(74) *Attorney, Agent, or Firm* — Kirton McConkie; Evan R. Witt

(57) ABSTRACT

An electronic device includes a motor, a sensing device and a controller. The motor provides a motive power to the load. The sensing device measures a plurality of motion parameters of the motor. The controller calculates a real system parameter between the motor and the load according to the motion command and the plurality of motion parameters. According to the motion command and the plurality of motion parameters, the controller acquires a real value of a rotation speed of the motor. Moreover, controller establishes a system model according to the motion command and the real system parameter so as to acquire an estimated value of the rotation speed of the motor. If the first mean square error is not smaller than the first target value, the controller performs a particle swarm optimization algorithm to change the estimated value of the rotation speed of the motor.

13 Claims, 9 Drawing Sheets

(56) References Cited

U.S. PATENT DOCUMENTS

2014/0125774 A1* 5/2014 Lee .................. G06T 3/4038
348/47
2017/0116103 A1 4/2017 Cencini et al.

FOREIGN PATENT DOCUMENTS

| CN | 102004008 B | 9/2014 |
|----|-------------|--------|
| CN | 103944481 B | 3/2016 |
| CN | 107153735 A | 9/2017 |
| TW | 492933 B | 7/2002 |
| TW | I600988 B | 10/2017 |
| TW | 201908758 A | 3/2019 |
| TW | 202006574 A | 2/2020 |

OTHER PUBLICATIONS

Waqas Ali, "Speed control of electrical drives with resonant loads", Master's Thesis of Aalto University Schoolof Electrical Engineering, Jun. 2, 2011.

Maurice Clerc, "Stagnation Analysis in Particle Swarm Optimisation or What Happens When Nothing Happens", 2006. hal-00122031.

* cited by examiner

ELECTRONIC DEVICE AND CONTROL METHOD THEREOF

CROSS-REFERENCE TO RELATED APPLICATION

This application claims the benefit of U.S. Provisional Application No. 62/961,488 filed on Jan. 15, 2020. The entirety of the above-mentioned patent application is incorporated herein by reference for all purposes.

FIELD OF THE INVENTION

The present disclosure relates to an electronic device and a control method of the electronic device, and more particularly to an electronic device and a control method for establishing a system model according to the system parameters related to the electronic device and continuously updating the system model to make the control mechanism more precise and optimize the operation quality.

BACKGROUND OF THE INVENTION

Generally, an electronic device includes a motor device to provide motive power to a load. Due to the motive power, the load performs various functional and/or continuous operations. For example, in case that the electronic device is a production device, the production device uses the internal motor device to drive the loads which are responsible for different processing procedures. Consequently, the corresponding processing operations are performed, and the semi-finished products or processed products are manufactured.

For allowing the loads to be accurately operated, it is important to effectively and precisely control the operations of the electronic device. As known, if the operations of the electronic device are influenced by the external interference, the aging condition or other variation factors, the loads cannot be accurately operated.

For solving these drawbacks, the electronic device has to continuously monitor the parameter changes. When a variation event occurs, the motion command is properly adjusted or the operation is stopped immediately. Consequently, the electronic device is operated in the optimized state, and the loads are accurately operated.

Therefore, there is a need of providing an improved electronic device and its control method in order to overcome the drawbacks of the conventional technologies.

SUMMARY OF THE INVENTION

An object of the present disclosure provides an electronic device and a control method for the electronic device. Since the electronic device is precisely controlled, the load can be accurately operated.

An object of the present disclosure provides an electronic device and a control method for the electronic device. When the mechanism variation occurs, a motion command is properly adjusted or the operation is stopped immediately. Consequently, the operating quality is enhanced.

In accordance with an aspect of the present disclosure, an electronic device is provided. The electronic device is electrically coupled to a load. The electronic device includes a motor, a sensing device and a controller. The motor provides a motive power to the load. The sensing device measures a plurality of motion parameters of the motor. The controller enables the motor according to a motion command, and the controller calculates a real system parameter between the motor and the load according to the motion command and the plurality of motion parameters. When the controller completes to calculate the real system parameter, the controller acquires a real value of a rotation speed of the motor according to the motion command and the plurality of motion parameters, and the controller establishes a system model according to the motion command and the real system parameter so as to acquire an estimated value of the rotation speed of the motor. The controller calculates a first mean square error between the real value and the estimated value to determine whether the first mean square error is smaller than a first target value. If the controller determines that the first mean square error is not smaller than the first target value, the controller performs a particle swarm optimization algorithm to update the real system parameter for adjusting the system model, so that the estimated value of the rotation speed of the motor is changed to adjust the first mean square error.

In accordance with another aspect of the present disclosure, a control method for an electronic device is provided. The control method includes the following steps. In a step (S1), a motor of the electronic device is enabled according to a motion command for providing a motive power to a load. In a step (S2), a plurality of motion parameters of the motor are measured. In a step (S3), a real system parameter between the motor and the load is calculated according to the motion command and the plurality of motion parameters. In a step (S4), a real value of a rotation speed of the motor is acquired according to the motion command and the plurality of motion parameters. In a step (S5), a system model is established according to the motion command and the real system parameter so as to acquire an estimated value of the rotation speed of the motor. Then, a step (S6) is performed to calculate a first mean square error between the real value and the estimated value to determine whether the first mean square error is smaller than a first target value. If the first mean square error is not smaller than the first target value, the control method further includes a step (S7) of performing a particle swarm optimization algorithm to update the real system parameter for adjusting the system model, so that the estimated value of the rotation speed of the motor is changed to adjust the first mean square error.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1A:
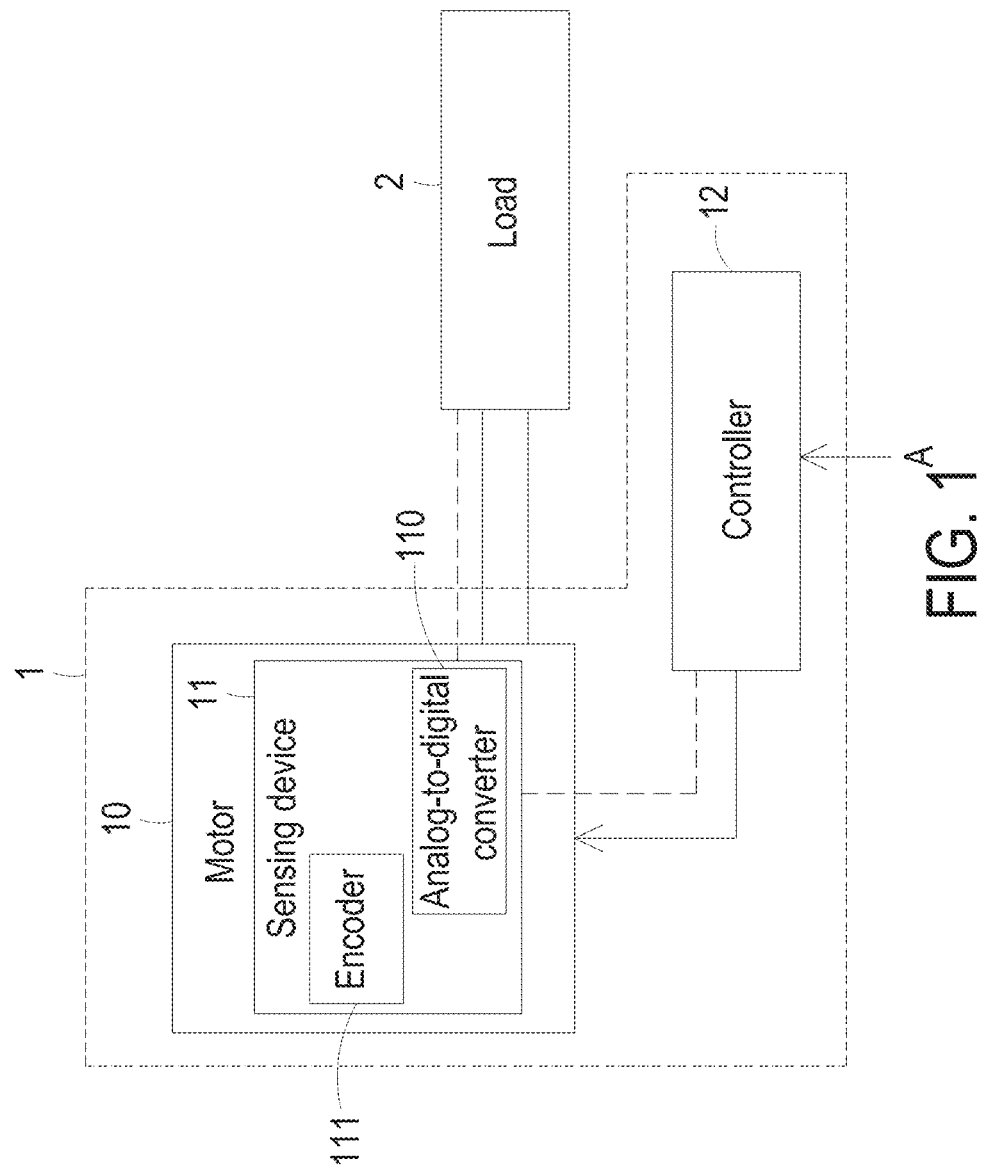
FIG. 1 schematically illustrates the architecture of an electronic device according to an embodiment of the present disclosure.
Figure 2A:
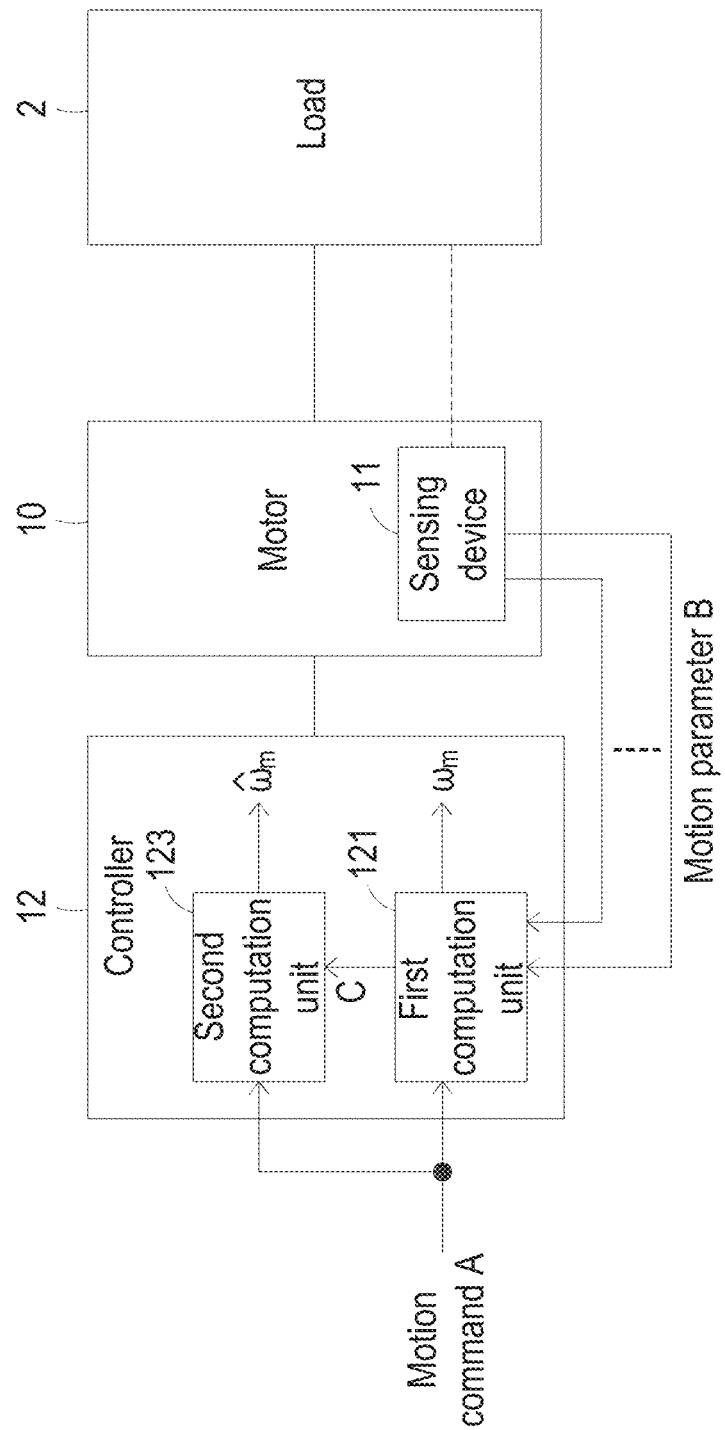
FIG. 2A schematically illustrates the principles of generating a real value and an estimated value of a rotation speed of the motor according to the embodiment of the present disclosure.

Please refer to FIGS. 1 and 2A. FIG. 1 schematically illustrates the architecture of an electronic device according to an embodiment of the present disclosure. FIG. 2A schematically illustrates the principles of generating a real value and an estimated value of a rotation speed of the motor according to the embodiment of the present disclosure. The electronic device 1 is electrically coupled to at least one load 2. The number of the load 2 can be one or more, but the present invention is not limited thereto. In an embodiment, the electronic device 1 is electrically coupled to one load 2, and the load 2 is located outside or inside the electronic device 2. In another embodiment, the electronic device 1 is electrically coupled to a plurality of loads 2, and the plurality of loads 2 are disposed outside or inside the electronic device 1.

The electronic device 1 includes a motor 10, a sensing device 11 and a controller 12. The controller 12 includes a first computation unit 121 and a second computation unit 123. The motor 10 provides motive power to the load 2 in order to operate the load 2. The sensing device 11 is configured to measure the motion status of the motor 10 for generating a plurality of motion parameters B. Moreover, the sensing device 11 delivers the plurality of motion parameters B to the controller 12. Preferably but not exclusively, the plurality of motion parameters B include three phase current values of the motor 10 and a rotation angle, a rotation speed and/or a rotation acceleration of the motor 10.

Please refer to FIG. 2A again. The controller 12 is coupled to the motor 10 and the sensing device 11. According to the motion command A, the controller 12 controls the operations of the motor 10. Moreover, according to the motion command A and the plurality of motion parameters B sensed by the sensing device 11, the controller 12 calculates real system parameters C between the motor 10 and the load 2. In some embodiments, the sensing device 11 can also be configured to measure the motion parameters of the load 2.

In some other embodiments, the controller 12 is coupled to a computing device (not shown). For example, the computing device is an industrial computer. The user may provide the motion command A to the controller 12 through the computing device. In some embodiments, the real system includes the motor 10 and load 2 while the motor 10 and the load 2 are operated.

Please refer to FIGS. 1 and 2A again. The sensing device 11 provides the plurality of motion parameters B of the motor 10. According to the motion command A and the plurality of motion parameters B, the first computation unit 121 of the controller 12 calculates the real system parameters C and a real value $\omega_m$ of the rotation speed of the motor 10. In some other embodiments, an encoder 111 of the sensing device 11 measures a rotation position (e.g., a rotation angle) of the motor 10 and provides the rotation position to the first computation unit 121. According to the measured rotation position, the first computation unit 121 performs a mathematic operation (e.g., through an operator 1/s) to acquire the real value $\omega_m$ of the rotation speed of the motor 10.

According to the motion command A and the plurality of motion parameters B, the first computation unit 121 of the controller 12 calculates the real system parameters C. For example, the real system parameters C include a rotational inertia of the motor 10, a rotational inertia of the load 2, a rigidity coefficient between the motor 10 and the load 2, and a damping coefficient between the motor 10 and the load 2.

Then, the first computation unit 121 provides the real system parameters C to the second computation unit 123. According to the motion command A and the real system parameters C, the second computation unit 123 establishes a system model to acquire the estimated value $\hat{\omega}_m$ of the rotation speed of the motor 10. In this embodiment, the system model is configured to simulate the motion status between the motor 10 and the load 2, or the system model is configured to indicate the motion status of the electronic device 1. However, the present invention is not limited thereto.

The system model established by the second computation unit 123 may be expressed by the following mathematic formula (1):

$$\frac{\omega_m}{\tau} = \frac{1}{(J_L + J_M)S} \cdot \frac{J_L S^2 + C_f + K_f}{\frac{J_L \cdot J_M}{J_L + J_M} S^2 + C_f + K_f} \quad (1)$$

In the mathematic formula (1), $\omega_m$ is the real value obtained by the first computation unit 121, and $\tau$ is the motor torque in the motion command A, and $J_L$ is the rotational inertia of the load 2, and $C_f$ is the damping coefficient of the load 2, and $K_f$ is the rigidity coefficient between the motor 10 and the load 2, and $J_M$ is the rotational inertia of the motor 10. According to the real system parameters C (e.g., $J_L$, $C_f$, $K_f$, $J_M$), the second computation unit 123 establishes a system model (shown as the mathematic formula (1)) to acquire the estimated value $\hat{\omega}_m$ of the rotation speed of the motor 10. The system model is a simplified model for simulating the operations of the motor 10 and the load 2.

Figure 2B:
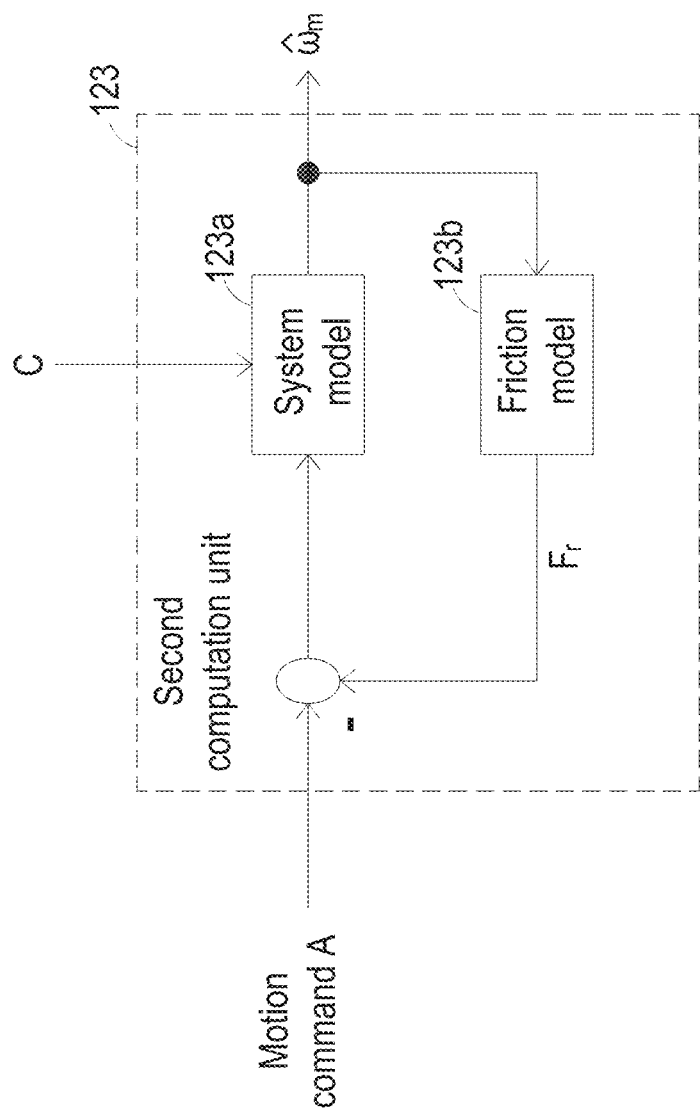
FIG. 2B schematically illustrates the operating principles of the second computation unit of the controller.

FIG. 2B schematically illustrates the operating principles of the second computation unit of the controller. Please refer to FIGS. 1, 2A and 2B. According to the motion command A and the real system parameters C, the second computation unit 123 establishes the system model 123a to acquire the estimated value $\hat{\omega}_m$ of the rotation speed of the motor 10. Then, according to the estimated value $\hat{\omega}_m$ and the friction coefficient, the second computation unit 123 establishes a friction mode 123b. For example, the friction mode 123b is a LuGre friction model, but the present invention is not limited thereto.

The LuGre friction model is a nonlinear friction model. In this embodiment, the second computation unit 123 generates a friction force Fr according to the friction mode 123b. Moreover, the second computation unit 123 calculates the difference between the nonlinear friction force Fr and the motion command A (e.g., the motor torque $\tau$ in the motion command A). According to the difference between the friction force Fr and the motion command A, the second computation unit 123 adjusts the system model 123a to change the estimated value $\hat{\omega}_m$ of the rotation speed of the motor 10. Since the nonlinear friction force Fr of the motor 10 is taken into consideration, the accuracy of the estimated value $\hat{\omega}_m$ is increased.

Please refer to FIGS. 1, 2A and 2B. The controller 12 also calculates a first mean square error between the real value $\omega_m$ and the estimated value $\hat{\omega}_m$ to determine whether the first mean square error is smaller than a first target value set by the user. If the controller 12 determines that the first mean square error is not smaller than the first target value, the established system model cannot effectively reflect the real system parameters C. Meanwhile, the controller 12 performs a particle swarm optimization (PSO) algorithm to update the real system parameters C for adjusting the system model. Consequently, the estimated value $\hat{\omega}_m$ of the rotation speed of the motor 10 is changed.

The first mean square error may be expressed by the following mathematic formula (2):

$$\text{first mean square error} = \frac{1}{n}\sum_{i=1}^{n}(\hat{\omega}_m - \omega_m)^2 \quad (2)$$

In the mathematic formula (2), $\omega_m$ is the real value of the rotation speed of the motor 10, and $\hat{\omega}_m$ is the estimated value of the rotation speed of the motor 10, and n is the number of data points in the motion command A. According to the mathematic formula (2), the controller 12 acquires the first mean square error.

If the first mean square error is smaller than the first target value, the controller 12 further determines whether the electronic device 1 has variations. In an embodiment, the controller 12 acquires ideal system parameters between the motor 10 and the load 2 according to the motion command A and the plurality of motion parameters B of the motor 10, and the controller 12 calculates a second mean square error between the real system parameters C and the ideal system parameters to determine whether the second mean square error is smaller than a second target value set by the user. If the controller 12 determines that the second mean square error is smaller than the second target value, the controller 12 determines that the electronic device 1 has no variations.

The second mean square error may be expressed by the following mathematic formula (3):

$$\text{second mean square error} = \frac{1}{n}\sum_{i=1}^{n}(\hat{\omega}_{mr} - \hat{\omega}_{m\_init})^2 \quad (3)$$

In the mathematic formula (3), $\hat{\omega}_{mr}$ indicates the real system parameters between the motor 10 and the load 2 (e.g., the real system parameters C as described in FIG. 2A), and $\hat{\omega}_{m\_init}$ indicates the ideal system parameters between the motor 10 and the load 2. According to the mathematic formula (3), the controller 12 acquires the second mean square error.

As mentioned above, if the second mean square error is smaller than the second target value, the controller 12 determines that the electronic device 1 has no variations. Then, if the controller 12 does not receive the motion command A, the controller 12 disables the motor 10.

Whereas, if the second mean square error is not smaller than the second target value, the controller 12 determines that the electronic device 1 has the variations (or malfunctions). Then, the controller 12 determines whether the motion command A has been adjusted. If the motion command A has been adjusted, the controller 12 updates the real system parameters C according to the adjusted motion command A for changing the estimated value $\hat{\omega}_m$ of the rotation speed of the motor 10. Moreover, the controller 12 re-determines whether the first mean square error is smaller than the first target value. However, if the controller 12 determines that the motion command A has not been adjusted, the controller 12 disables the motor 10.

In some embodiments, if the controller 12 determines that the electronic device 1 has the variations, the controller 12 delivers a notification signal to the computing device. The user may determine whether the motion command A is adjusted through the computing device. If the user determines that the motion command A is not adjusted, it is necessary to stop the motor 10 and the load 2 for maintenance.

As the mentioned embodiment above, the electronic device 1 is a production device. Preferably but not exclusively, the production device is a machine tool with at least one axle. For example, the production device is a milling machine. The production device selectively performs system identification mode, processing mode or idle mode. After the production device is equipped with a processing tool (e.g., a cutting tool) and the production device is enabled, the production device enters the system identification mode. When the production device is in the processing mode, the production device performs a processing operation to manufacture at least one processed product. When the processing tool is temporarily removed from the production device, the production device is in the idle mode. The production device in the idle mode executes the same commands as the production device in the processing mode. However, the production device in the idle mode cannot manufacture the processed product.

When the particle swarm optimization (PSO) algorithm is performed, a swarm of particles are spread into the given range solution space in order to search the best solution. In each time of the optimization algorithm, each particle is related to the parameter in search of a part of the local best solution. During the searching process, each particle records its currently-searched local best solution. Consequently, there is a moving target during the searching process. In addition, each particle is moved toward the global best solution of all particles. Consequently, the global optimum efficiency is enhanced. The motion of each particle may be expressed by the following mathematic formula (4):

$$\begin{cases} id = \omega \times Vid + C1 \times \text{Rand}() \times (Pid - Xid) + \\ \quad C2 \times \text{Rand}() \times (Gbest - Xid) \\ Xid = Xid + Vid \end{cases} \quad (4)$$

In the mathematic formula (4), Vid is a velocity of a particle id and in the range [−VMAX, VMAX], $\omega$ is an inertial weight coefficient, C1 is a self-confidence coefficient, and C2 is a social confidence coefficient. In the whole process of the PSO algorithm, the swarm optimum value decreases linearly, C1 and C2 are constants, and Rand( ) is a random number generator. In the normal distribution, the random number generator generates a random number in the range between 0 and 1. In addition, Xid and Pid are respectively the best solutions of a specified particle id in the current position and the data range, and Gbest is the best solution of the entire swarm.

The contents of the PSO algorithm may be referred to the following non-patent literature 1:

[Non-patent literature 1] Maurice Clerc, "Stagnation Analysis in Particle Swann Optimisation or What Happens When Nothing Happens", 2006. hal-00122031.

In an embodiment, the system model contains a motor model and a friction model. In another embodiment, the system model contains the motor model only. The motor model M may be expressed by the following mathematic formula (5). For example, the friction mode is a LuGre friction model. The friction model may be expressed by the following mathematic formula (6).

$$M = \frac{1}{(J_L + J_M)S} \cdot \frac{J_L S^2 + C_f + K_f}{\frac{J_L \cdot J_M}{J_L + J_M} S^2 + C_f + K_f} \cdot \tau \quad (5)$$

$$\begin{cases} F = \sigma_0 z + \sigma_1 \dot{z} + \sigma_2 \omega \\ \dot{z} = \omega - \sigma_0 \frac{\omega}{g(\omega)} z \\ g(\omega) = F_c + (F_s - F_c) e^{-\left(\left|\frac{\omega}{w_s}\right|\right)^2} \end{cases} \quad (6)$$

In the mathematic formula (5), $J_L$ is the rotational inertia of the load 2, and $J_M$ is the rotational inertia of the motor 10, and $C_f$ is the damping coefficient between the motor 10 and the load 2, and $K_f$ is the rigidity coefficient between the motor 10 and the load 2, and $\tau$ is the motor torque. In the mathematic formula (6), F is the friction force, and z is the bristle deflection, and $\sigma_0$ is the stiffness coefficient, and $\dot{z}$ is the velocity of average bristle deflection, and $\sigma_1$ is the damping coefficient, and $\sigma_2$ is the viscous coefficient, and $F_c$ is the Coulomb friction force, and $F_s$ is the static friction force, and $\omega$ is the sliding speed, and $v_s$ is the Stribeck velocity.

According to the motion command A and the real system parameters C, the second computation unit 123 of the controller 12 establish the system model M to acquire the estimated value $\hat{\omega}_m$ of the rotation speed of the motor 10. Moreover, according to the estimated value $\hat{\omega}_m$ and the friction coefficient, the controller 12 establishes a friction mode. For increasing the accuracy of the system model, the controller 12 may adjust the estimated value $\hat{\omega}_m$ of the rotation speed according to the motor model and the friction model.

The contents of the LuGre friction model may be referred to the following non-patent literature 2:

[Non-patent literature 2] Vincent Lampaert, Jan Swevers, and Farid Al-Bender, "Modification of the Leuven Integrated Friction Model Structure", IEEE TRANSACTIONS ON AUTOMATIC CONTROL, VOL. 47, NO. 4, April 2002.

In some embodiments, the sensing device 11 includes an analog-to-digital converter 110 to sense the three phase current values of the motor 10. Moreover, the sensing device 11 further includes an encoder 111 to sense the rotation position (e.g., the rotation angle) of the motor 10.

Figure 3A:
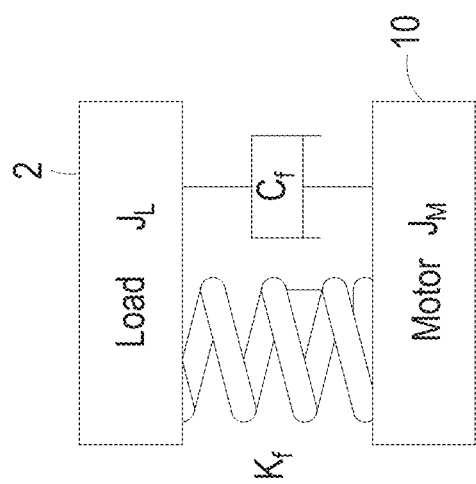
FIG. 3A schematically illustrates a simple structure of a two-mass resonant system with the electronic device and the load.
Figure 3B:
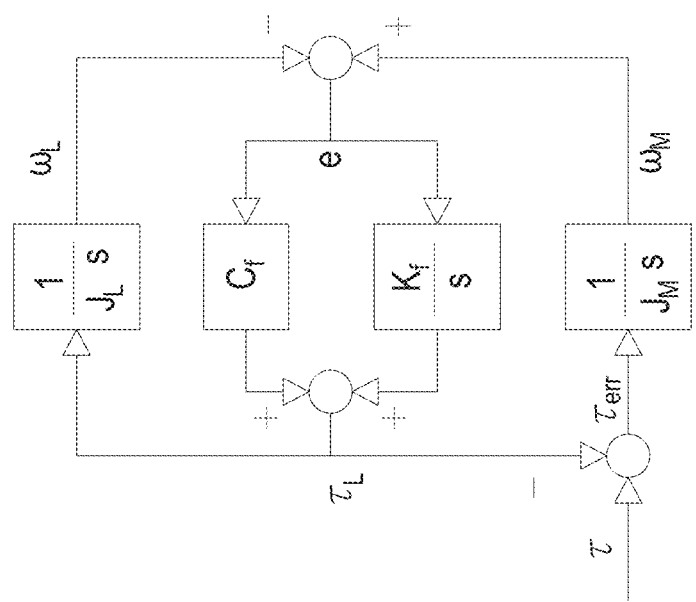
FIG. 3B is a schematic block diagram of the two-mass resonant system.

FIG. 3A schematically illustrates a simple structure of a two-mass resonant system with the electronic device and the load. FIG. 3B is a schematic block diagram of the two-mass resonant system. In an embodiment, the electronic device 1 and at least one load 2 are collaboratively formed as a multi-mass resonant system. As shown in FIGS. 3A and 3B, the electronic device 1 and one load 2 are collaboratively formed as a two-mass resonant system. In other words, the above system model is a system model of the two-mass resonant system. Preferably but not exclusively, the system parameters include the rotational inertia $J_M$ of the motor 10, the rotational inertia $J_L$ of the load 2, the rigidity coefficient $K_f$ between the motor 10 and the load 2, and the damping coefficient $C_f$ between the motor 10 and the load 2. In the block diagram of FIG. 3B, $\tau$ is a motor torque, $\omega_M$ is the rotation speed of the motor 10, $\tau_L$ is the load torque, $\omega_L$ is the rotation speed of the load 2, $\tau_{err}$ is the torque error, and e is the velocity between the motor 10 and the load 2.

The contents of the multi-mass resonant system may be referred to the following non-patent literature 3:

[Non-patent literature 3] Waqas Ali, "Speed control of electrical drives with resonant loads", MASTER'S THESIS OF AALTO UNIVERSITY SCHOOL OF ELECTRICAL ENGINEERING, Feb. 6, 2011.

Figure 4:
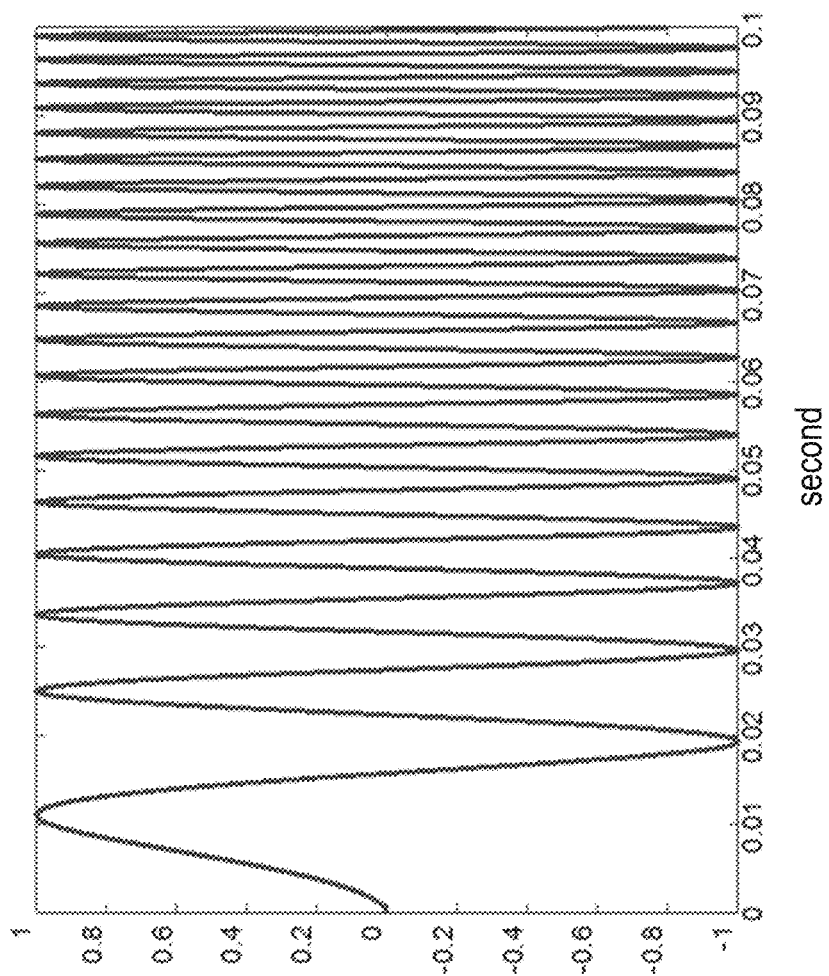
FIG. 4 is a schematic waveform diagram illustrating a multi-frequency sweep signal for exciting the electronic device when the electronic device is in the system identification mode.
Figure 5:
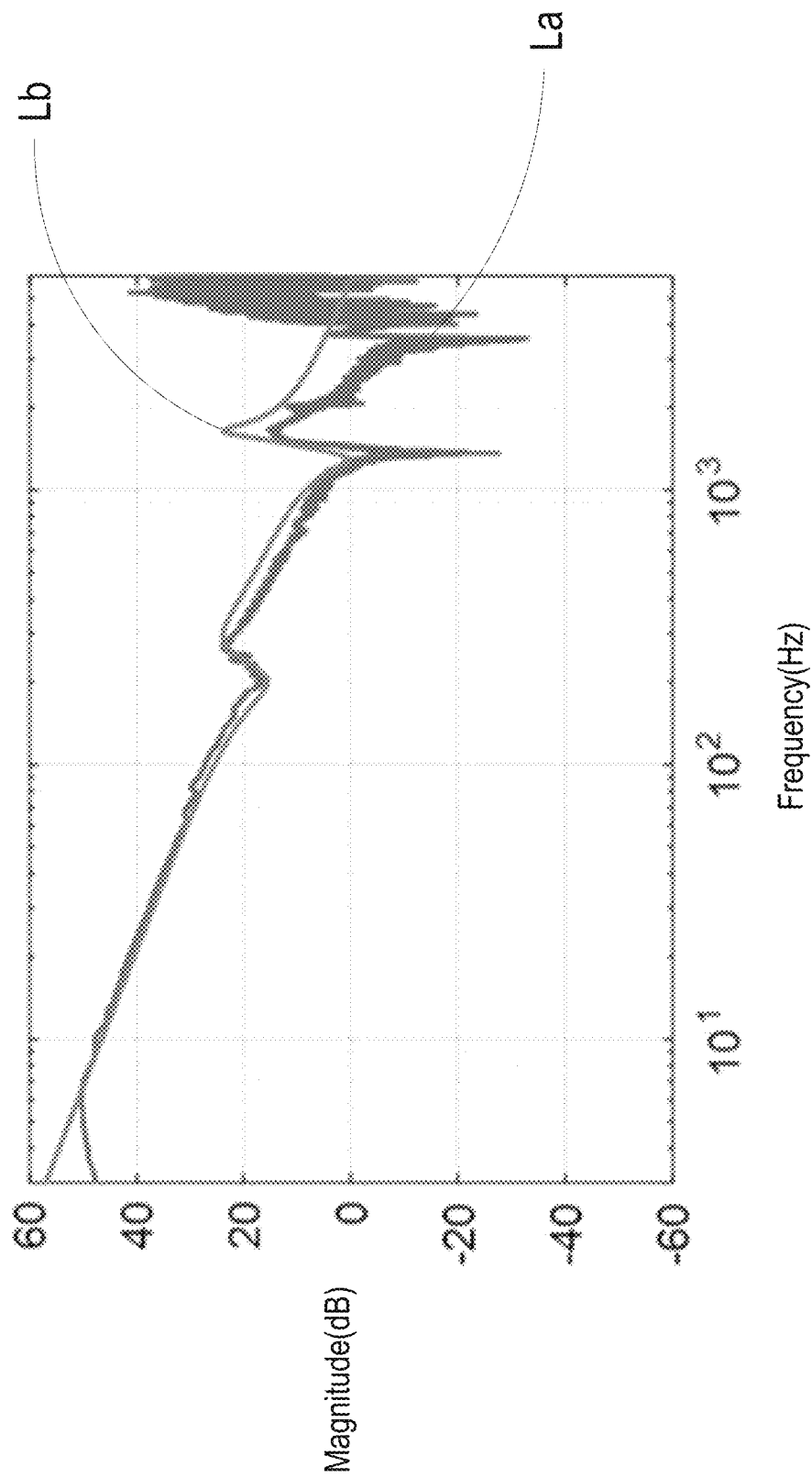
FIG. 5 is a Bode plot associated with the system parameters of the two-mass resonant system.

FIG. 4 is a schematic waveform diagram illustrating a multi-frequency sweep signal for exciting the electronic device when the electronic device is in the system identification mode. FIG. 5 is a Bode plot associated with the system parameters of the two-mass resonant system. Please refer to FIGS. 1, 4 and 5. When the electronic device 1 is in the off-line system identification mode, the controller 12 continuously issues a multi-frequency sweep signal to excite the electronic device 1 and collects and records a first curve La about the frequency response of the electronic device 1. Moreover, the controller 12 acquires a second curve Lb according to the types of the real system parameters C. After the second curve Lb is fitted to the first curve La, the controller 12 acquires the real system parameters C between the motor 10 and the load 2.

From the above descriptions, the electronic device 1 establishes the system model according to the real system parameters C, and the system model performs associated control operations. If the system model is unable to effectively reflect the real system parameters C, the particle swarm optimization (PSO) algorithm is used to update the real system parameters C in real time and adjust the system model. Since the system model is optimized, the electronic device 1 is controlled more precisely and the operating quality of the electronic device 1 is enhanced. Moreover, the electronic device 1 can continuously monitor the changes of the system parameters C. When the mechanism variation occurs, the motion command A is properly adjusted or the operation is stopped immediately. Consequently, the electronic device 1 can be operated in the optimized state, and the load 2 can be accurately operated.

Figure 6A:
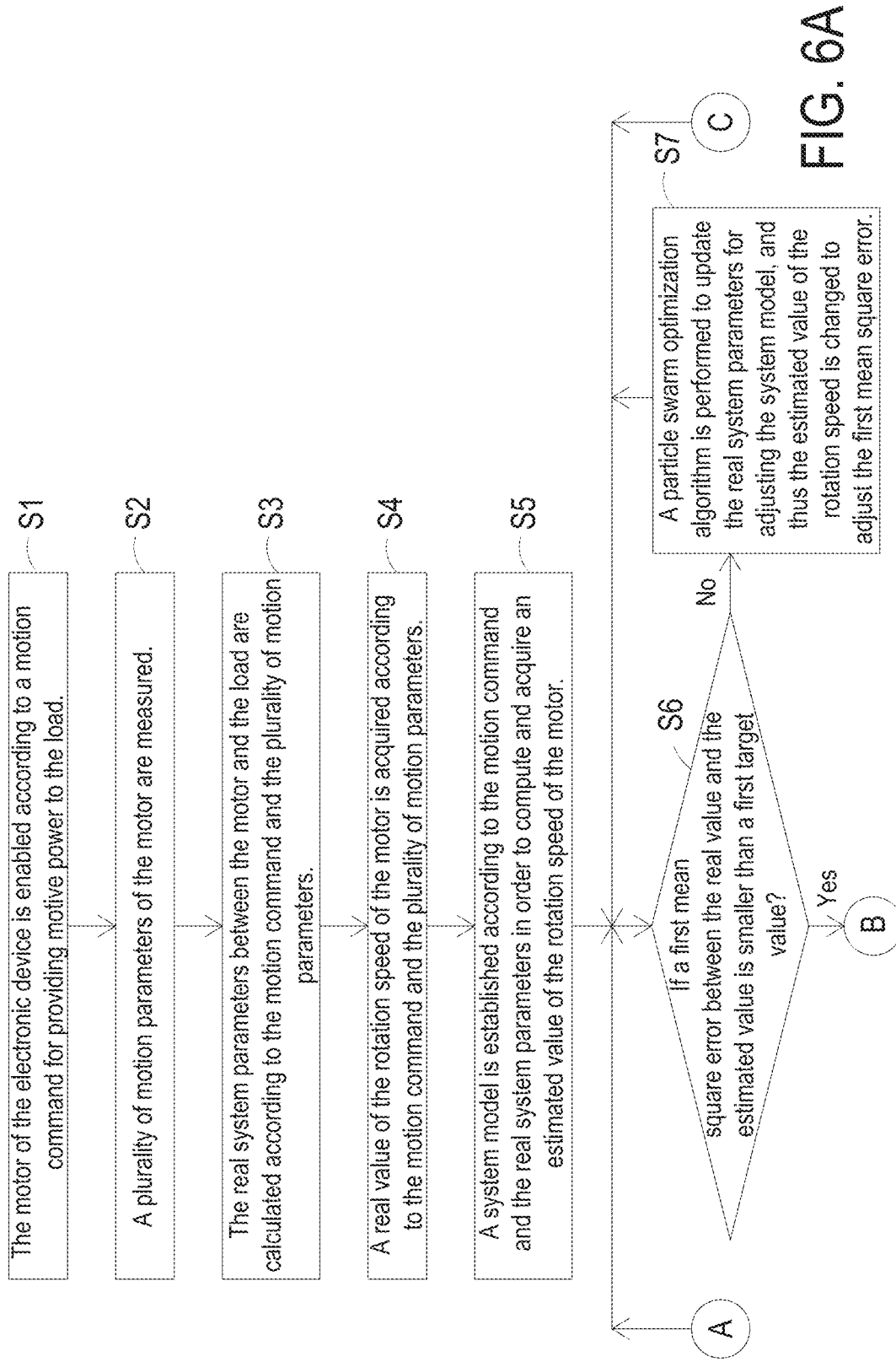
FIGS. 6A and 6B schematically illustrate a flowchart of a control method for the electronic device of the present disclosure.
Figure 6B:
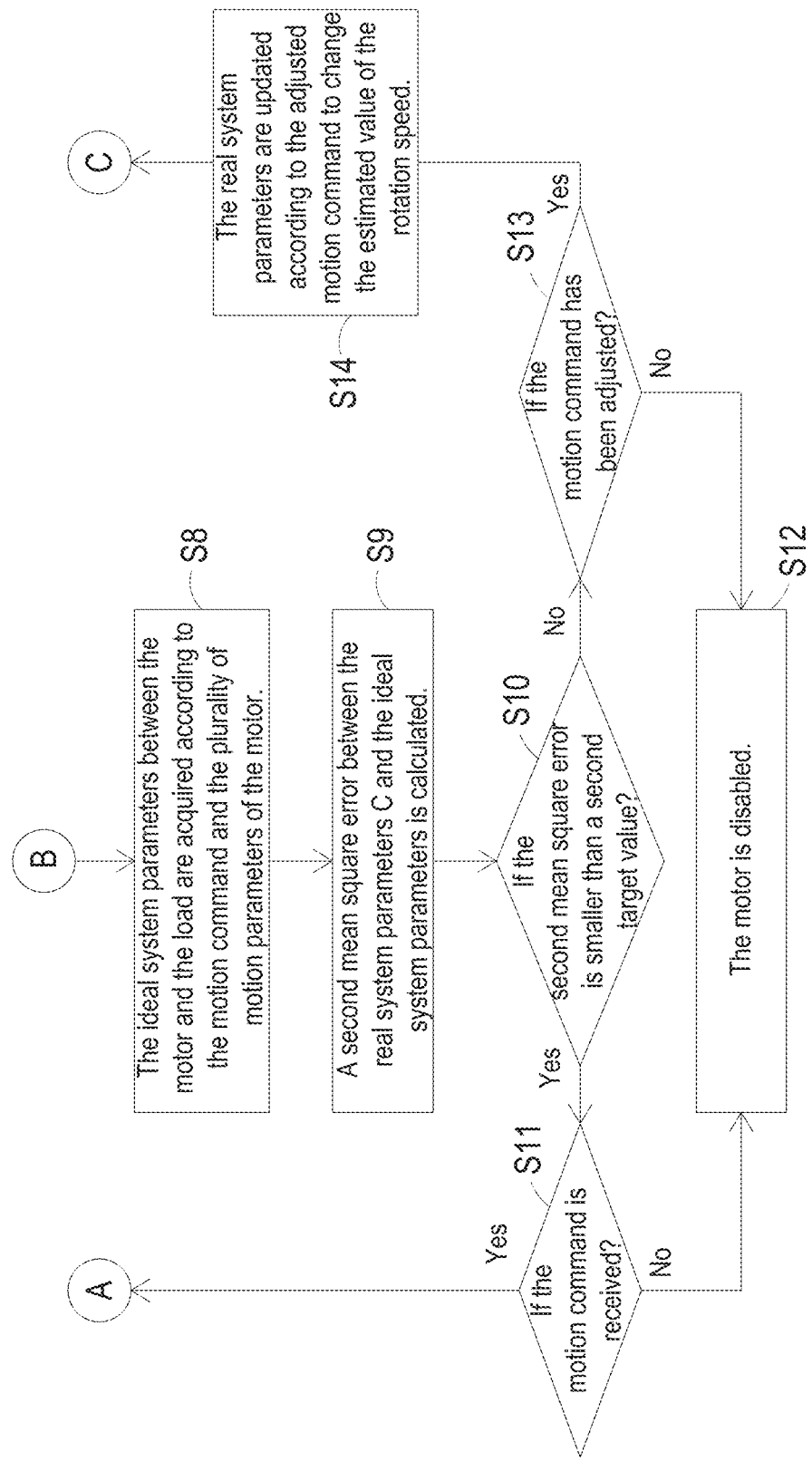

FIGS. 6A and 6B schematically illustrate a flowchart of a control method for the electronic device of the present disclosure. Please refer to FIGS. 2A, 2B, 6A and 6B. The control method is applied to the electronic device 1 and performed by the controller 12. The control method includes the following steps.

In the step S1, the controller 12 enables the motor 10 of the electronic device 1 according to a motion command A for providing motive power to the load 2.

In the step S2, the sensing device 11 measures a plurality of motion parameters B of the motor 10.

In the step S3, the controller 12 calculates the real system parameters C between the motor 10 and the load 2 according to the motion command A and the plurality of motion parameters B.

In the step S4, the first computation unit 121 of the controller 12 acquires a real value $\omega_w$ of the rotation speed of the motor 10 according to the motion command A and the plurality of motion parameters B.

In the step S5, the second computation unit 123 of the controller 12 establishes a system model (e.g., the system model is shown as mathematic formula (1)) according to the motion command A and the real system parameters C, and the second computation unit 123 computes and acquires estimated value $\hat{\omega}_m$ of the rotation speed of the motor 10 based on the system model.

In the step S6, the controller 12 calculates a first mean square error between the real value $\omega_m$ and the estimated value $\hat{\omega}_m$ (e.g., according to the mathematic formula (2)) to determine whether the first mean square error is smaller than a first target value. If the controller 12 determines that the first mean square error is not smaller than the first target value, the step S7 is performed.

In the step S7, the established system model cannot effectively reflect the real system parameters C. Meanwhile, the controller 12 performs a particle swarm optimization algorithm to update the real system parameters C for adjusting the system model, and thus the estimated value $\hat{\omega}_m$ of the rotation speed of the motor 10 is changed to adjust the first mean square error. After the step S7 is completed, the step S6 is performed.

If the determining result of the step S6 indicates that the first mean square error is smaller than the first target value, the step S8 is performed. In the step S8, the controller 12 acquires ideal system parameters between the motor 10 and the load 2 according to the motion command A and the plurality of motion parameters B of the motor 10.

In the step S9, the controller 12 calculates a second mean square error between the real system parameters C and the ideal system parameters according to the mathematic formula (3).

In the step S10, the controller 12 determines whether the second mean square error is smaller than a second target value.

If the determining result of the step S10 indicates that the second mean square error is smaller than the second target value, the controller 12 determines that the electronic device 1 has no variations. Then, a step S11 is performed. In the step S11, the controller 12 determines whether the controller 12 receives the motion command A. If the determining result of the step S11 indicates that the motion command A is not received, a step S12 is performed. In the step S12, the controller 12 disables the motor 10. Whereas, if the determining result of the step S11 indicates that the motion command A is received, the step S6 is repeatedly done. For example, if the motion command A is not received by the controller 12, it means that the task performed by the electronic device 1 is completed. Consequently, the user stops providing the motion command A to the controller 12 through the computing device. On the other hand, if the task performed by the electronic device 1 has not been completed, the user continuously provides the motion command A to the controller 12 through the computing device.

If the determining result of the step S10 indicates that the second mean square error is not smaller than the second target value, the controller 12 determines that the electronic device 1 has variations. Then, a step S13 is performed. In the step S13, the controller 12 determines whether the motion command A has been adjusted. If the determining result of the step S13 indicates that the motion command A has been adjusted, a step S14 is performed. In the step S14, the controller 12 updates the real system parameters C according to the adjusted motion command A to change the estimated value $\hat{\omega}_m$ of the rotation speed of the motor 10.

Whereas, if the determining result of the step S13 indicates that the motion command A has not been adjusted, the step S12 is performed to disable the motor 10. After the step S14 is performed, the step S6 is repeatedly done.

From the above descriptions, the present disclosure provides an electronic device and a control method for the electronic device. The electronic device establishes a system model according to real system parameters, and the system model performs associated control operations. If the system model is unable to effectively reflect the real system parameters, a particle swarm optimization algorithm is used to update the real system parameters in real time for adjusting the system model. Since the system model is optimized, the electronic device is controlled more precisely and the operating quality of the electronic device is enhanced. Moreover, the electronic device can continuously monitor the changes of the system parameters. When the mechanism variation occurs, the motion command is properly adjusted or the operation is stopped immediately. Consequently, the electronic device can be operated in the optimized state, and the load can be accurately operated.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An electronic device electrically coupled to a load, the electronic device comprising:
    a motor, configured to provide a motive power to the load;
    a sensing device, configured to measure a plurality of motion parameters of the motor; and
    a controller, configured to enable the motor according to a motion command, and calculate a real system parameter between the motor and the load according to the motion command and the plurality of motion parameters,
    wherein when the controller completes to calculate the real system parameter, the controller acquires a real value of a rotation speed of the motor according to the motion command and the plurality of motion parameters, and the controller establishes a system model according to the motion command and the real system parameter so as to acquire an estimated value of the rotation speed of the motor,
    wherein the controller calculates a first mean square error between the real value and the estimated value to determine whether the first mean square error is smaller than a first target value,
    wherein if the controller determines that the first mean square error is not smaller than the first target value, the controller performs a particle swarm optimization algorithm to update the real system parameter for adjusting the system model, so that the estimated value of the rotation speed of the motor is changed to adjust the first mean square error.

2. The electronic device according to claim 1, wherein if the first mean square error is smaller than the first target value, the controller acquires an ideal system parameter between the motor and the load according to the motion command and the plurality of motion parameters, wherein the controller calculates a second mean square error between the real system parameter and the ideal system parameter to determine whether the second mean square error is smaller than a second target value, wherein if the second mean square error is smaller than the second target value, the controller determines that the electronic device has no variations.

3. The electronic device according to claim 2, wherein if the controller determines that the second mean square error is smaller than the second target value and does not receive the motion command, the controller disables the motor.

4. The electronic device according to claim 2, wherein if the second mean square error is not smaller than the second target value, the controller determines that the electronic device has variations, and the controller further determines whether the motion command has been adjusted, wherein if the motion command has been adjusted, the controller updates the real system parameters according to the adjusted motion command for changing the estimated value of the rotation speed of the motor, wherein if the motion command has not been adjusted, the controller disables the motor.

5. The electronic device according to claim 1, wherein the system model comprises a motor model and a friction model.

6. The electronic device according to claim 5, wherein the controller establishes the motor model according to the motion command and the real system parameter so as to acquire the estimated value of the rotation speed of the motor, and the controller establishes the friction mode according to the estimated value of the rotation speed and a friction coefficient.

7. The electronic device according to claim 6, wherein the controller further adjusts the estimated value of the rotation speed according to the motor model and the friction model.

8. The electronic device according to claim 1, wherein the plurality of motion parameters of the motor comprise three phase current values of the motor and a rotation angle, a rotation speed and/or a rotation acceleration of the motor.

9. The electronic device according to claim 8, wherein the sensing device comprises:
  an analog-to-digital converter, configured to sense the three phase current values of the motor; and
  an encoder, configured to sense the rotation angle of the motor.

10. The electronic device according to claim 1, wherein the real system parameter comprises a rotational inertia of the motor, a rotational inertia of the load, a rigidity coefficient between the motor and the load, and a damping coefficient between the motor and the load.

11. A control method for an electronic device, the control method comprising steps of:
  (S1) enabling a motor of the electronic device according to a motion command for providing a motive power to a load;
  (S2) measuring a plurality of motion parameters of the motor;
  (S3) calculating a real system parameter between the motor and the load according to the motion command and the plurality of motion parameters;
  (S4) acquiring a real value of a rotation speed of the motor according to the motion command and the plurality of motion parameters;
  (S5) establishing a system model according to the motion command and the real system parameter so as to acquire an estimated value of the rotation speed of the motor; and
  (S6) calculating a first mean square error between the real value and the estimated value to determine whether the first mean square error is smaller than a first target value, wherein if the first mean square error is not smaller than the first target value, the control method further comprises a step (S7) of performing a particle swarm optimization algorithm to update the real system parameter for adjusting the system model, so that the estimated value of the rotation speed of the motor is changed to adjust the first mean square error.

12. The control method according to claim 11, wherein if the first mean square error is smaller than the first target value, the control method further comprises steps of:
  (S8) acquiring an ideal system parameter between the motor and the load according to the motion command and the plurality of motion parameters;
  (S9) calculating a second mean square error between the real system parameter and the ideal system parameter; and
  (S10) determining whether the second mean square error is smaller than a second target value, wherein if the second mean square error is smaller than the second target value, it is determined that the electronic device has no variations, and the control method further comprises a step (S11) of determining whether the motion command is received, wherein if the motion command is not received, the control method further comprises a step (S12) of disabling the motor.

13. The control method according to claim 12, wherein if the second mean square error is not smaller than the second target value, it is determined that the electronic device has variations, and the control method further comprises steps of:
  (S13) determining whether the motion command has been adjusted, wherein if the motion command has not been adjusted, the motor is disabled, wherein if the motion command has been adjusted, the control method further comprises a step (S14) of updating the real system parameter according to the adjusted motion command to change the estimated value of the rotation speed of the motor.

* * * * *